United States Patent
Heckerman et al.

(10) Patent No.: US 7,184,993 B2
(45) Date of Patent: Feb. 27, 2007

(54) SYSTEMS AND METHODS FOR TRACTABLE VARIATIONAL APPROXIMATION FOR INTERFERENCE IN DECISION-GRAPH BAYESIAN NETWORKS

(75) Inventors: David E. Heckerman, Bellevue, WA (US); Christopher A. Meek, Kirkland, WA (US); David M. Chickering, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 496 days.

(21) Appl. No.: 10/458,166

(22) Filed: Jun. 10, 2003

(65) Prior Publication Data
US 2004/0254903 A1    Dec. 16, 2004

(51) Int. Cl.
*G06F 17/00*    (2006.01)
*G06N 5/02*    (2006.01)
(52) U.S. Cl. .......................... 706/46; 706/12; 706/14; 706/52
(58) Field of Classification Search ........... 706/46, 706/12, 14, 52
See application file for complete search history.

(56) References Cited
U.S. PATENT DOCUMENTS

| | | | |
|---|---|---|---|
| 6,591,257 B1 * | 7/2003 | Martinka et al. | 706/46 |
| 6,728,692 B1 * | 4/2004 | Martinka et al. | 706/45 |
| 6,807,537 B1 * | 10/2004 | Thiesson et al. | 706/52 |
| 2003/0055614 A1 * | 3/2003 | Pelikan et al. | 703/2 |
| 2003/0167265 A1 * | 9/2003 | Corynen | 707/4 |
| 2004/0243548 A1 * | 12/2004 | Hulten et al. | 707/3 |

OTHER PUBLICATIONS

Michael I. Jordan, Zoubin Ghahramani, Tommi S. Jaakkola and Lawrence K. Saul, "An Introduction to Variational Methods for Graphical Models", Aug. 16, 2001, 52 pages.

* cited by examiner

*Primary Examiner*—Joseph P Hirl
(74) *Attorney, Agent, or Firm*—Amin, Turocy & Calvin, LLP

(57) ABSTRACT

The present invention leverages approximations of distributions to provide tractable variational approximations, based on at least one continuous variable, for inference utilization in Bayesian networks where local distributions are decision-graphs. These tractable approximations are employed in lieu of exact inferences that are normally NP-hard to solve. By utilizing Jensen's inequality applied to logarithmic distributions composed of a generalized sum including an introduced arbitrary conditional distribution, a means is acquired to resolve a tightly bound likelihood distribution. The means includes application of Mean-Field Theory, approximations of conditional probability distributions, and/or other means that allow for a tractable variational approximation to be achieved.

29 Claims, 10 Drawing Sheets

SYSTEMS AND METHODS FOR TRACTABLE VARIATIONAL APPROXIMATION FOR INTERFERENCE IN DECISION-GRAPH BAYESIAN NETWORKS

TECHNICAL FIELD

The present invention relates generally to data analysis, and more particularly to systems and methods for providing a tractable variational approximation for inference in a decision-graph Bayesian network.

BACKGROUND OF THE INVENTION

With the advent of the Internet, and especially electronic commerce ("e-commerce") over the Internet, the use of data analysis tools, has increased dramatically. In e-commerce and other Internet and non-Internet applications, databases are generated and maintained that have astronomically large amounts of information. Such information is typically analyzed, or "mined," to learn additional information regarding customers, users, products, etc. This information allows businesses and other users to better implement their products and/or ideas.

Data mining (also known as Knowledge Discovery in Databases—KDD) has been defined as "The nontrivial extraction of implicit, previously unknown, and potentially useful information from data." Data mining can employ machine learning, statistical and/or visualization techniques to discover and present knowledge in a form that is easily comprehensible to humans. Generally speaking, humans recognize or translate graphical items more easily than textual ones. Thus, larger amounts of information can be relayed utilizing this means than by other methods. As such, graphical statistical models have proven invaluable in data mining.

A Bayesian network is one type of a graphical statistical model that encodes probabilistic relationships among variables of interest. Over the last decade, the Bayesian network has become a popular representation for encoding uncertain expert knowledge in expert systems. More recently, researchers have developed methods for learning Bayesian networks from data. When used in conjunction with statistical techniques, the graphical model has several advantages for data analysis. First, because the model encodes dependencies among all variables, it readily handles situations where some data entries are missing. Second, a Bayesian network can be used to learn causal relationships, and hence can be used to gain understanding about a problem domain and to predict the consequences of intervention. Third, because the model has both a causal and probabilistic semantics, it is an ideal representation for combining prior knowledge (which often comes in causal form) and data. And fourth, Bayesian statistical methods in conjunction with Bayesian networks offer an efficient and principled approach for avoiding the over fitting of data.

Bayesian network statistical model variations include decision trees and decision graphs. A decision tree data structure corresponds generally to an acyclic, undirected graph where nodes are connected to other respective nodes via a single path. The graph is acyclic in that there is no path that both emanates from a vertex and returns to the same vertex, where each edge in the path is traversed only once. A probabilistic decision tree is a decision tree that is used to represent a conditional probability distribution for a target variable given some set of predictor variables. As compared to a table, which is another way to represent a conditional probability distribution when all variables are discrete, a tree is generally a more efficient way of storing probabilities because of its ability to represent equality constraints within a conditional probability distribution.

A decision graph is a further generalization of a decision tree. Similar to a decision tree, a decision graph can represent equality constraints in a conditional probability distribution. In contrast to a decision tree, however, non-root nodes in a decision graph can have more than one parent. This characteristic enables a richer set of relationships to be represented by a decision graph than by a decision tree. For example, relationships between a non-root node and multiple parent nodes can be represented in a decision graph by corresponding edges interconnecting the non-root node with its parent nodes.

Graphical models facilitate probability theory through the utilization of graph theory. This allows for a method of dealing with uncertainty while reducing complexity. The modularity of a graphical model permits representation of complex systems by utilizing less complex elements. The connections and relationships of individual elements are identified by the probability theory, while the elements themselves are constructed by the graph theory. Utilizing graphics also provides a much more intuitive human interface to difficult problems.

Nodes of a probabilistic graphical model represent random variables. Their connectivity can indicate associative qualities such as dependence and independence and the like. If no connectivity (i.e., "arcs") are present, this represents conditional independence assumptions, providing a representation of joint probability distributions. Graphical models can be "directed" or "undirected" depending on how they are constructed. Undirected graphical models have a more simplistic definition of independence, while directed graphical models are more complex by nature. Bayesian or "Belief" networks (BN) are included in the directed category and are utilized extensively in statistics and artificial intelligence to show causality between elements or "nodes." They are also highly beneficial in supplying "inferences." That is, they arc able to infer information based on a posterior probability (i.e., "likelihood") utilizing Bayes' rule. Thus, for a given outcome, its cause can be probabilistically deduced utilizing a directed graphical model. Inferencing is a very powerful tool that is employed in many facets of society.

Often determining an exact inference requires significant computational power due to the complexity of the inference algorithm. It is helpful to approximate the inference in this case rather than compute the exact inference. Such methods of inference approximations include variational methods, sampling methods, loopy belief propagation, bounded cutest conditioning, and parametric approximation methods and the like. An example of variational methods is mean-field approximation. This method exploits the law of large numbers to approximate large sums of random variables by their means. A variational parameter is introduced for each node after they have been decoupled. These parameters are iteratively updated to minimize cross entropy between approximate and true probability distributions. Thus, updating the parameters becomes representative of inference.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to data analysis, and more particularly to systems and methods for providing a tractable variational approximation, based on at least one continuous variable, for inference in a decision-graph Bayesian network. Approximations of distributions are leveraged to provide tractable variational approximation methods in place of exact methods that are normally NP-hard to solve. This provides a substantially faster means to provide inferences for Bayesian networks where local distributions are decision-graphs, without substantial loss of accuracy. By utilizing Jensen's inequality applied to logarithmic distributions composed of a generalized sum including an introduced arbitrary conditional distribution, a means is acquired to resolve a tightly bound likelihood distribution. The means includes application of Mean-Field Theory (MFT), approximations of conditional probability distributions, and/or other means that allow for a tractable variational approximation to be achieved. The present invention also facilitates approximations for inference by providing a method that does not require calculating a conditional probability ratio of two marginal distributions, reducing the complexity of approximation methods.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
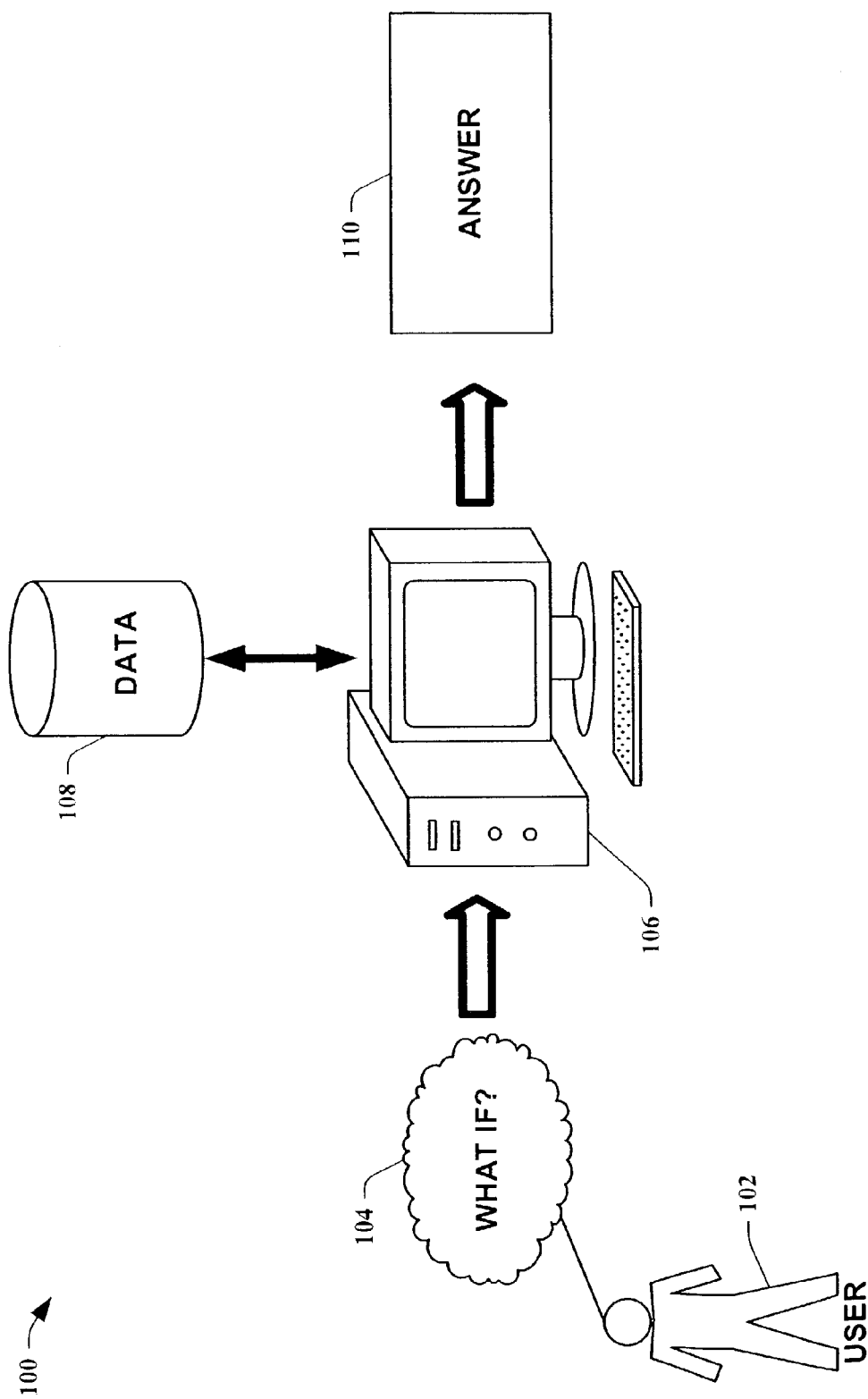
FIG. 1 is a diagram of a data analysis system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention is a tractable approximation for inference in Bayesian networks where local distributions are decision graphs. Bayesian networks are directed graphical models that can be elaborated by relating local conditional probabilities with each node in an acyclic directed graph. The type of approximation utilized by the present invention is known as a variational approximation that operates on decision-graph Bayesian networks. Many prediction problems that employ a Bayesian network require inference for solving queries. Having a tractable approximation for inference facilitates these applications, for example, to respond to such queries in a reasonable amount of time.

Probabilistic inference in graphical models involves determining a conditional probability distribution over values of nodes such as unobserved nodes given values of other nodes such as observed nodes. Examples utilized for the present invention employ an H to represent hidden or unobserved nodes and an X to represent observed nodes. Thus, typically equations are set to resolve a conditional probability distribution utilizing H given X such as:

$$P(H \mid X) = \frac{P(H, X)}{P(X)}. \qquad \text{Eq. (1)}$$

Thus, by employing Bayes' Theorem, a posterior or conditional probability is found by dividing a joint distribution of H and X by a marginal probability or "likelihood" of X. Although the conditional probability is equated to a ratio of probabilities, it is not necessary with the present invention to calculate this ratio in order to achieve tractable variational approximations for inference in decision-graph Bayesian networks.

Exact algorithms to resolve Equation (1) for inference tend to become unmanageable as their complexity increases. Therefore, it is often beneficial to utilize approximations instead of an exact algorithm. One type of approximate inference algorithm is the variational method. It permits deterministic approximations that result in bounded probabilities of interest. Complex graphical structures can be simplified by averaging parameters, yielding manageable approximations while maintaining reasonable accuracy. It is not uncommon, however, to utilize characteristics of several different types of algorithms, including exact algorithms, within a variational method. These methods can also be employed to provide tractable approximations for inference in Bayesian networks.

To fully appreciate the significance of the present invention, it is helpful to understand the context in which it can be utilized. In FIG. 1, a diagram of a data analysis system 100 in accordance with an aspect of the present invention is shown. This is an illustration of how inferencing is utilized in situations such as business marketing and the like. A user 102 in charge of forecasting a business concern ponders a question 104 regarding future sales for a product. The user 102 asks the question 104 of a system 106, such as a computing system, that has some means of accessing or referring to data 108 related to a database (i.e., meta data). The system 106 typically processes the question 104 utilizing a form of inference since the question 104 is asking for a prediction of future sales based on some past criteria. Thus, the system 106 provides a predictive answer 110 regarding future sales of the product in question. This is a top-level overview of how inference can be employed in a business situation. It does not mean that business is the only situation where inference is utilized. Other industries, academia, and research entities and the like also employ inference to resolve problems and derive information.

Figure 2:
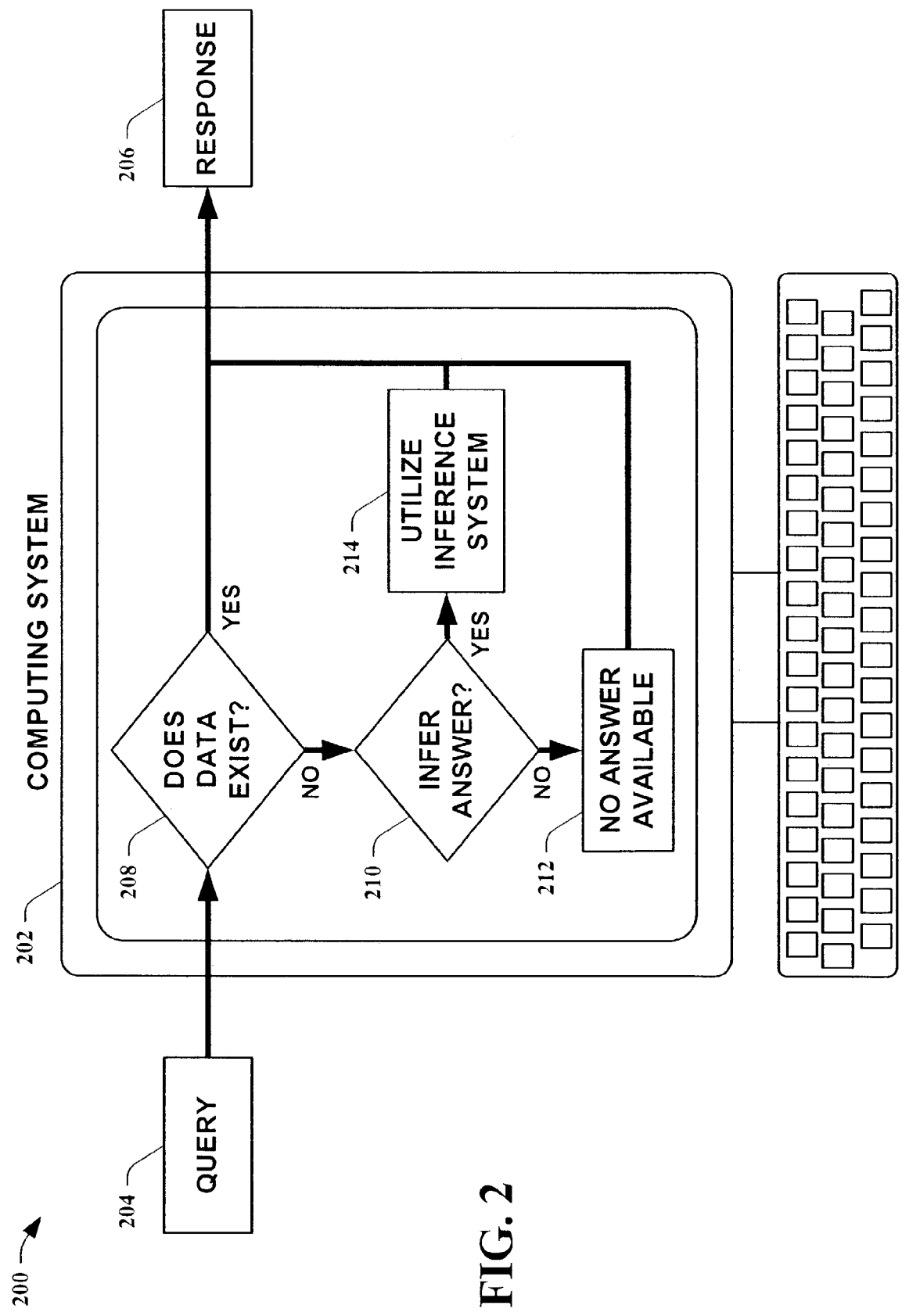
FIG. 2 is a block diagram of query handling of a data analysis system in accordance with an aspect of the present invention.

Turning to FIG. 2, a block diagram of query handling of a data analysis system 200 in accordance with an aspect of the present invention is depicted. The system 200 is comprised of a computing system 202 which accepts a query 204 and outputs a response 206. The query 204 enters the computing system 202, and the system 202 decides if data exists that can be utilized to directly respond to the query 204. If direct data answers the query 204, the response 206 is given. However, typically, a user enters a query that cannot be responded to via direct data. If the computing system 202 cannot infer a response, in this example, "no answer is available" 212 is the final response 206. More than likely, the computing system 202 will attempt to compute a response based on inferencing data by utilizing an inference system 214. This inference system 214 can be any means that allows processing of data to give predictive outcomes. However, as noted supra, finding exact inferences can be computationally intensive, making a timely response almost impossible, if not impossible, due to the magnitude of computing power required to solve such a problem. In this scenario, the present invention can be employed as the inference system 214 and utilized to efficiently provide a tractable variational approximation for decision-graph Bayesian networks.

Figure 3:
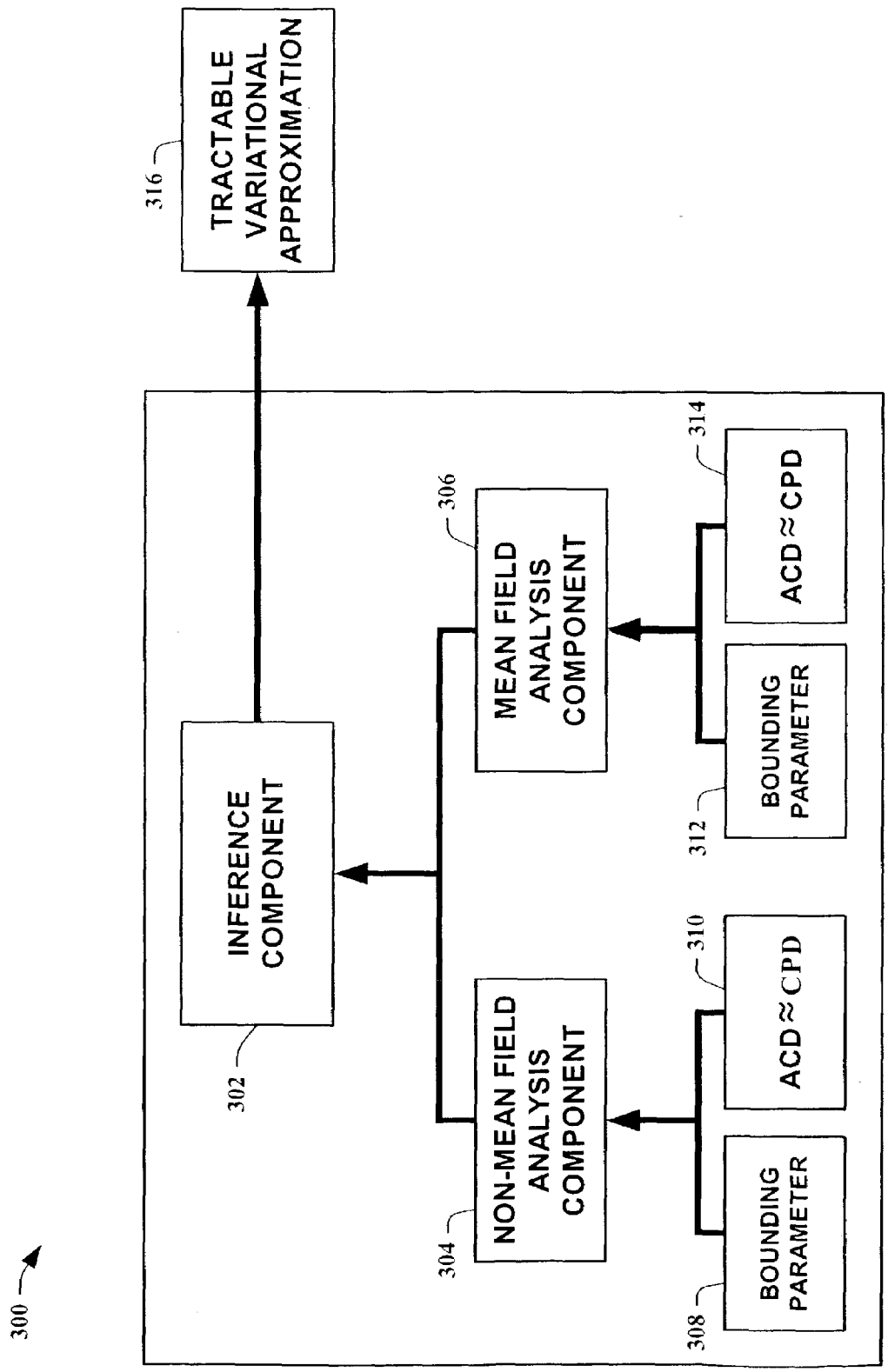
FIG. 3 is a block diagram of an inference system in accordance with an aspect of the present invention.

Referring to FIG. 3, a block diagram of an inference system 300 in accordance with an aspect of the present invention is shown. In this instance of the present invention, the system 300 is comprised of an inference component 302, a non-mean-field analysis component 304, and a mean-field analysis component 306. The inference component 302, such as an approximation component for example, produces a tractable variational approximation 316 for inference in a decision-graph Bayesian network. Each analysis component 304, 306 can receive input parameters 308–314 to influence how the approximation 316 is derived. A bounding parameter 308 is utilized within the non-mean-field analysis component 304 to produce a bounded, non-mean-field approximation. Likewise, a bounding parameter 312 is utilized within the mean-field analysis component 306 to produce a bounded, mean-field approximation. In this instance of the present invention, for example, a specific parameter such as "ACD≈CPD" input parameter 310 is utilized by the non-mean-field analysis component 304 to produce a non-mean-field approximation based on an arbitrary conditional distribution (ACD) approximating a conditional probability distribution (CPD). Likewise, "ACD≈CPD" input parameter 314 is utilized by the mean-field analysis component 306 to produce a mean-field approximation based on an arbitrary conditional distribution (ACD) approximating a conditional probability distribution (CPD).

Figure 4:
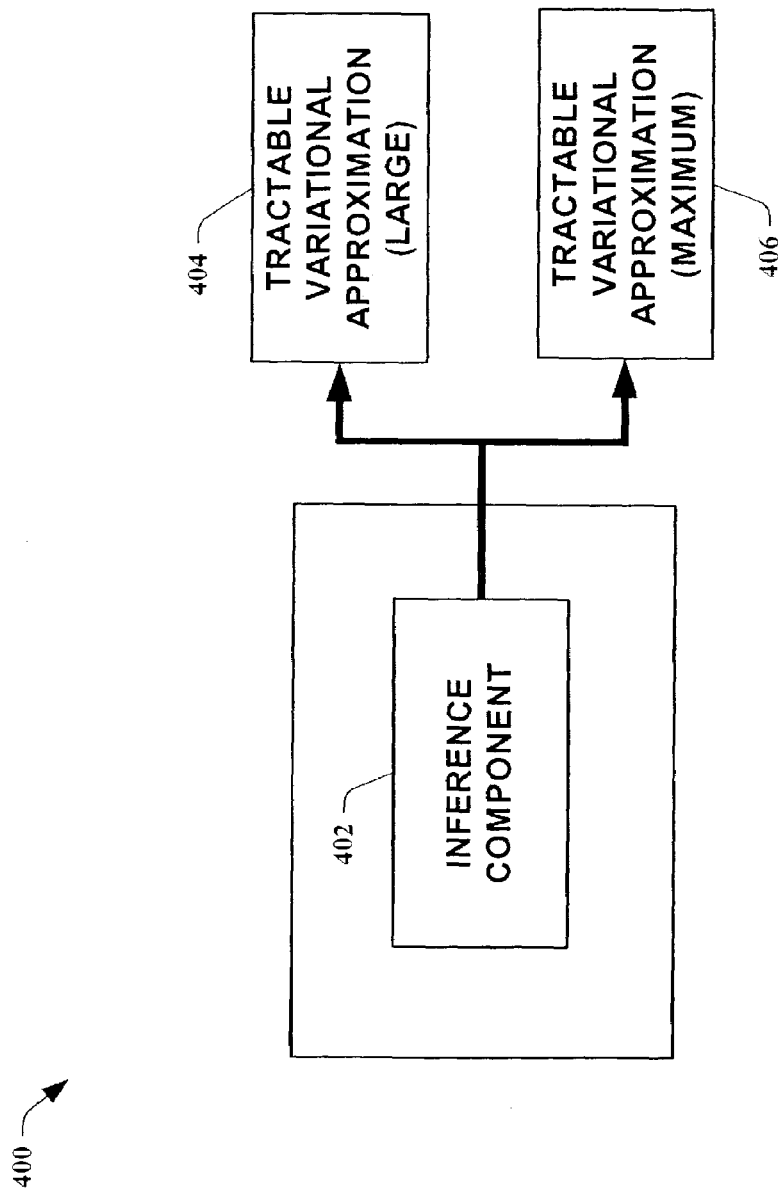
FIG. 4 is another block diagram of an inference system in accordance with an aspect of the present invention.

Turning to FIG. 4, another block diagram of an inference system 400 in accordance with an aspect of the present invention is illustrated. The system 400 is comprised of an inference component 402 in this example. The inference component 400 produces two example approximations 404, 406. One result includes a tractable variational approximation 404 that is derived by substantially increasing a right hand side of a bounding equation such that it obtains a closer proximity to its maximum value than to its medial value. Similarly, the other result, in this example, includes a tractable variational approximation 406 that is derived by increasing the right hand side of the bounding equation such that it obtains its maximum value. Thus, the present invention retains flexibility that allows it to be implemented based on a desired outcome.

Since the context of how an instance of the present invention can be employed is better understood, details of how it is implemented are now discussed. Inference in a Bayesian network is the computation of conditional probability distributions. Inference, in this case, is known to be NP-hard ("NP" is the class that a nondeterministic Turing machine accepts in polynomial time, and the complexity class of decision problems that are intrinsically harder than those that can be solved by a nondeterministic Turing machine in polynomial time are "NP-hard."). For example, assume a Bayesian network for variables U such that each local distribution for a variable is a decision graph. When the variable is discrete (having a finite number of states), each node of the decision graph is assumed to have an unconstrained discrete distribution. When the variable is continuous, each node is assumed to have a univariate Gaussian distribution. Therefore, likelihood for the decision-graph Bayesian network can be written as the summation of all joint probabilities for X and H:

$$p(x) = \sum_h p(x, h); \quad \text{Eq. (2)}$$

where H (or "h") is a set of variables (e.g., hidden variables) such that variables in X (or "x") (e.g., evidenced or observed variables) and H make up a full domain of the Bayesian network U. The sum over h is understood to be a generalized sum (i.e., sums for the discrete variables in H and integrals for the continuous variables in H).

Variational transforms allow bounds to be found on probabilities in graphical models such as Bayesian networks. They convert complex problems into simpler problems. A logarithm function is utilized to establish a linear function from a non-linear function. In this manner, a variable can be introduced into a function to facilitate in determining a bound. Near the limits of the bound, the variable will "decouple" and produce no effect on the function.

Thus, rewriting Equation (2) gives the logarithmic likelihood:

$$\log p(x) = \log\left[\sum_h (q(h \mid x))\left(\frac{p(x, h)}{q(h \mid x)}\right)\right]; \quad \text{Eq. (3)}$$

where q(h|x) is an introduced arbitrary conditional distribution over H given x. To find a bound utilizing this equation, Jensen's inequality is employed. This inequality bounds the logarithmic function of Equation (3), and it therefore becomes:

$$\log p(x) \geq \sum_h q(h \mid x)\log\left[\frac{p(x, h)}{q(h \mid x)}\right]. \quad \text{Eq. (4)}$$

This produces a lower bound for the logarithmic likelihood that always holds for all values. When the arbitrary conditional probability, q(h|x), is close to the joint distribution, p(x, h), in a well-known sense, the bound is tight, yielding a lower bound for the marginal probability or likelihood, p(x). Alternatively, in other instances of the present invention, the arbitrary conditional probability, q(h|x), is used as an approximation for p(h|x) as given by:

$$p(h|x) \propto q(h|x). \quad \text{Eq. (5)}$$

In order to obtain q(h|x) conditional distributions easier, q(h|x) factors are determined as follows:

$$q(h \mid x) = \prod_i q(h_i \mid x); \quad \text{Eq. (6)}$$

where each $H_i$ corresponds to a single variable in H. This leads to what is known as a "mean-field" variational approximation for marginal distribution, p(x). Given this factorization, good distributions are found by iterating the following for each i:

(1) fix $q(h_j|x)$ for all $h_j$ except j=i; and (2) find a $q(h_i|x)$ that yields a tight bound (e.g., maximized bound).

Since step (1) is straightforward, step (2) is now discussed in detail. Because the Bayesian network has decision graphs for its local distributions, the following additional constraints are imposed on each $q(h_i|x)$. When $H_i$ is discrete, $q(h_i)$ is an unconstrained discrete distribution. When $H_i$ is continuous, $q(h_i|x)$ is a piecewise Gaussian distribution such that cut points correspond to split points for $H_i$ among all decision graphs. Given these constraints, it turns out that, when fixing all but $h_i$, Equation (4) becomes the relation:

$$\log p(x) \geq \sum_h^i q(h_i \mid x)\log\left[\frac{p*(x, h_i)}{q(h_i \mid x)}\right]; \quad \text{Eq. (7)}$$

where p* (x, $h_i$) has the same distributional form as $q(h_i|x)$ (except p* is not normalized) and the summation is a generalized sum. Consequently, the $q(h_i|x)$ that makes this bound as tight as possible is given by:

$$q(h_i|x) \propto p*(x, h_i). \quad \text{Eq. (8)}$$

In fact, because p* and q have the same form, relaxing the constraints on q can not improve the bound. Therefore, $q(h_i|x)$ is variationally complete with respect to the mean-field approximation for decision-graph Bayesian networks. As those practiced in the art will recognize, the computation of p*(x, $h_i$) involves operations whose number is proportional to the number of nodes in the decision graphs that refer to $H_i$. Consequently, this mean-field approximation is tractable.

In view of the exemplary systems shown and described above, methodologies that may be implemented in accordance with the present invention will be better appreciated with reference to the flow charts of FIGS. 5–8. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions. such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 5:
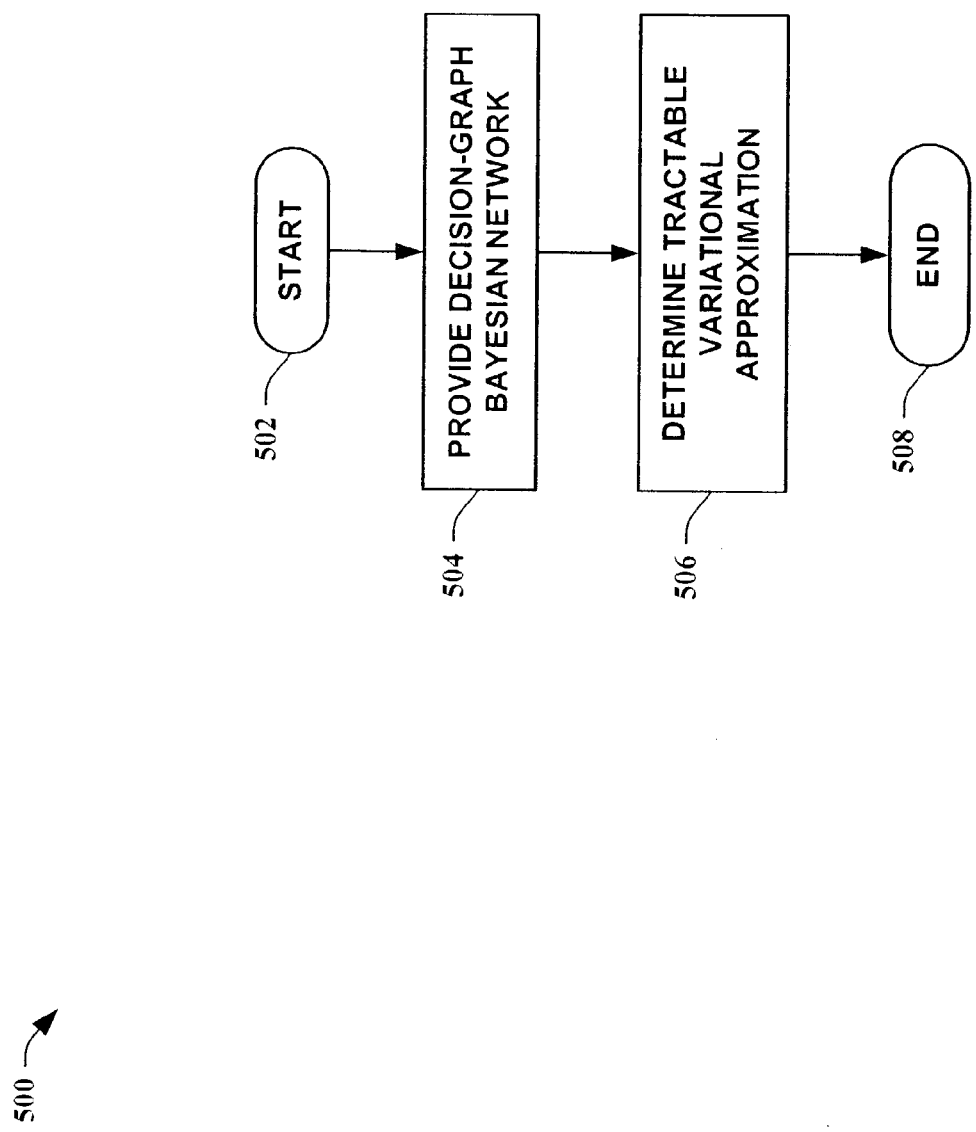
FIG. 5 is a flow diagram of a method of providing tractable variational approximations for inferences in accordance with an aspect of the present invention.

In FIG. 5, a flow diagram of a method 500 of providing tractable variational approximations for inferences in accordance with an aspect of the present invention is shown. The method 500 starts 502 by a component providing a Bayesian network where local distributions are decision graphs 504. The present invention then determines, based on at least on continuous variable, a tractable variational approximation for inference in the decision-graph Bayesian network 506, ending the flow 508. The method of determination can include non-mean-field and mean-field approximations utilizing a bound such as Equation (4), supra.

Figure 6:
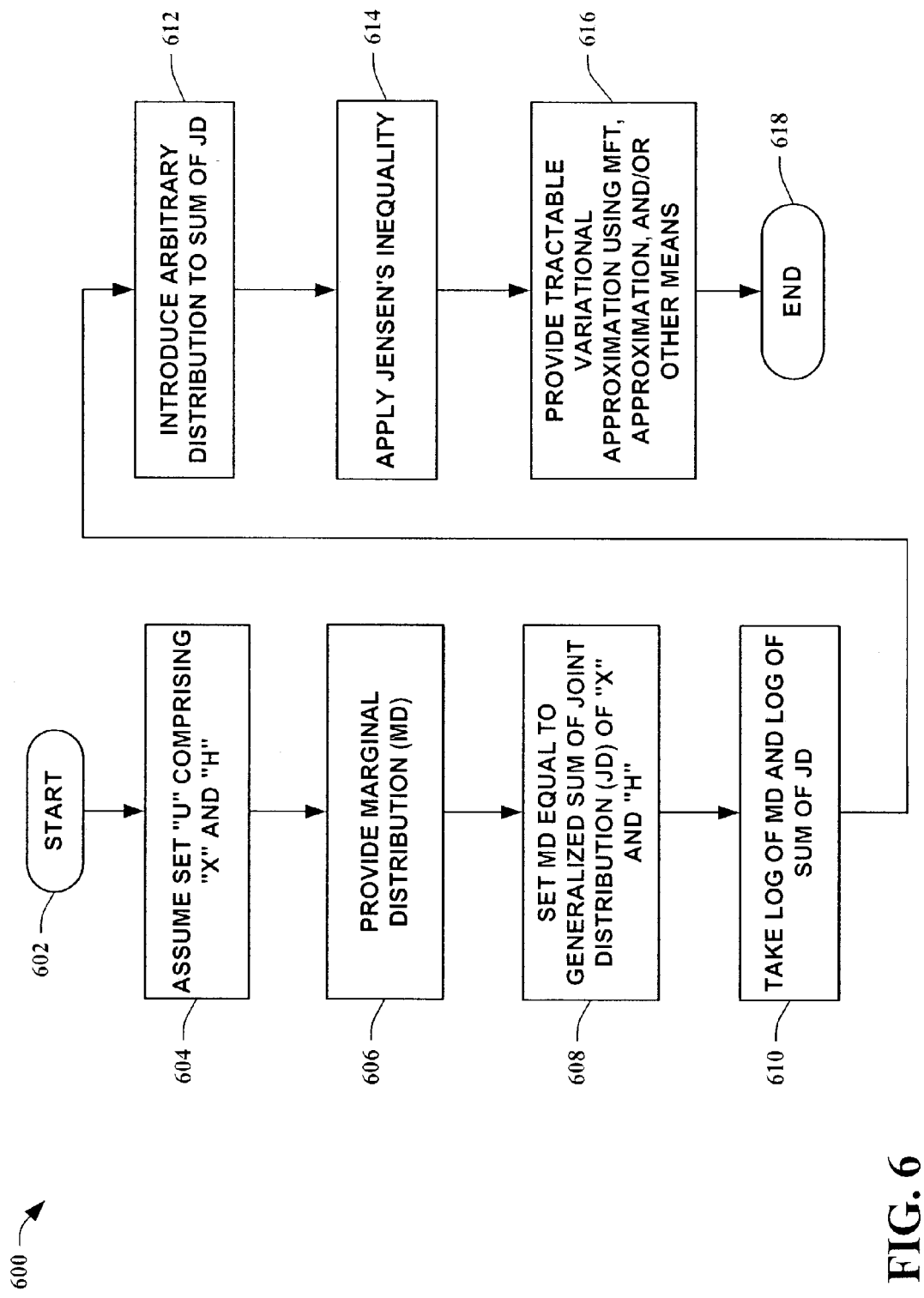
FIG. 6 is another flow diagram of a method of providing tractable variational approximations for inferences in accordance with an aspect of the present invention.

Turning to FIG. 6, another flow diagram of a method 600 of providing tractable variational approximations for inference in accordance with an aspect of the present invention is illustrated. The method 600 demonstrates an example of one instance of the present invention. The method 600 starts 602 by assuming a Bayesian network with a set of U variables comprised of an "X" set of variables and an "H" set of variables 604. A marginal distribution (MD) such as p(x), likelihood, is provided 606. The MD is then set equal to a generalized sum of a joint distribution (JD) of X and H as illustrated in Equation (2) 608.

$$p(x) = \sum_h p(x, h) \qquad \text{Eq. (2)}$$

A logarithmic operation is then performed on both sides of Equation (2) 610.

$$\log p(x) = \log \sum_h p(x, h) \qquad \text{Eq. (9)}$$

An arbitrary conditional distribution (ACD) is introduced on the right hand side of Equation (9) to the generalized sum of the joint distribution of X and H 612 resulting in an equation such as Equation (3).

$$\log p(x) = \log \left[ \sum_h (q(h \mid x)) \left( \frac{p(x, h)}{q(h \mid x)} \right) \right]. \qquad \text{Eq. (3)}$$

Jensen's inequality is then applied to the equation yielding a bounding equation 614 such as:

$$\log p(x) \geq \sum_h q(h \mid x) \log \left[ \frac{p(x, h)}{q(h \mid x)} \right]. \qquad \text{Eq. (4)}$$

This equation is then utilized to find a tractable variational approximation by employing such techniques as mean-field theory, distribution approximations, and/or other means that achieve tractable variational approximation 616, ending the flow 618.

Figure 7:
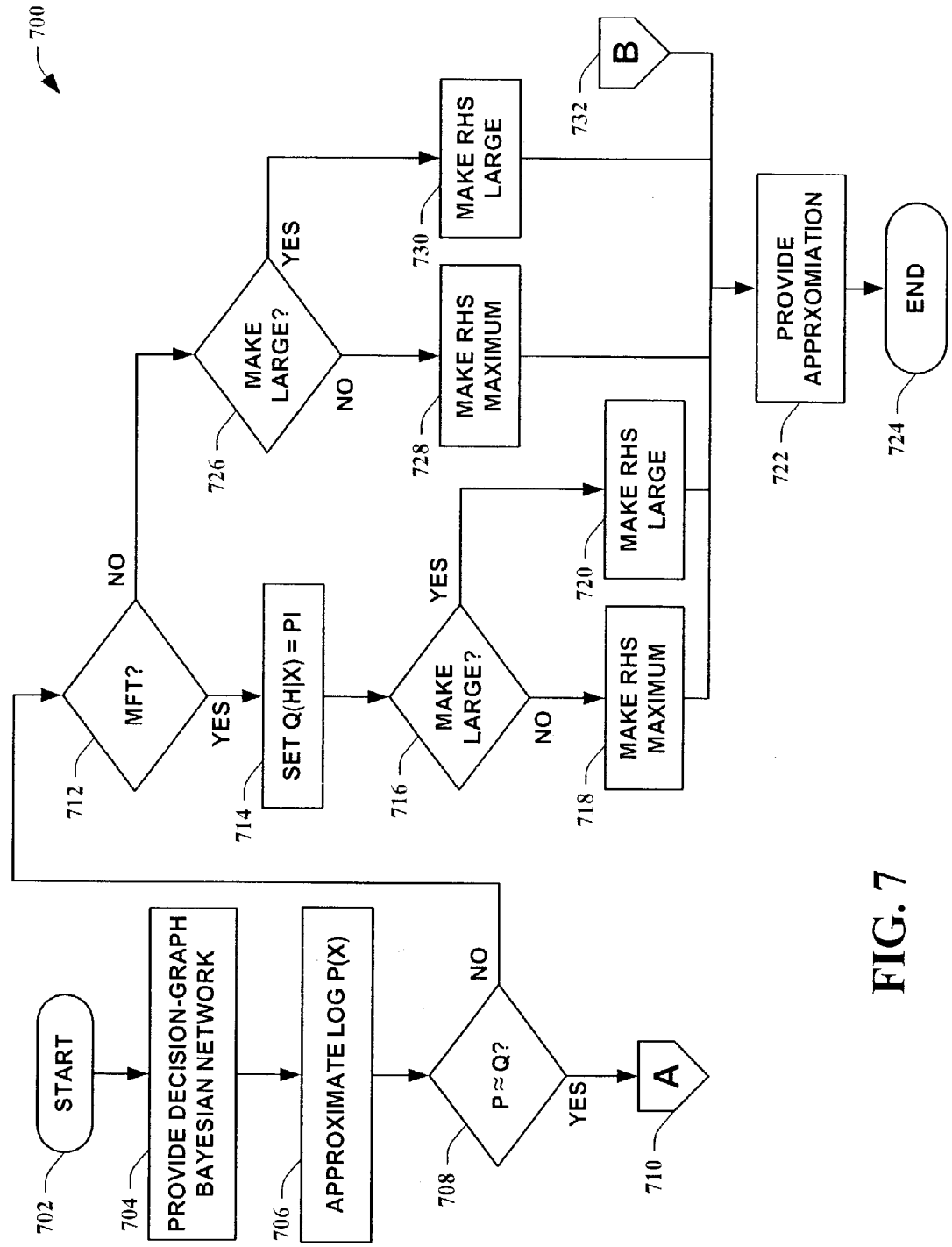
FIG. 7 is yet another flow diagram of a method of providing tractable variational approximations for inferences in accordance with an aspect of the present invention.

Referring to FIG. 7, yet another flow diagram of a method 700 of providing tractable variational approximations for inferences in accordance with an aspect of the present invention is illustrated. The method 700 starts 702 by providing a Bayesian network where local distributions are decision graphs 704. A logarithmic likelihood, log p(x), is approximated utilizing a bounding equation as discussed supra and in FIG. 6 706 such as:

$$\log p(x) \geq \sum_h q(h \mid x) \log \left[ \frac{p(x, h)}{q(h \mid x)} \right]. \qquad \text{Eq. (4)}$$

A determination is then made as to whether an approximation is to be incorporated utilizing an arbitrary conditional distribution (ACD) 708 such that:

$$p(h|x) \propto q(h|x) \qquad \text{Eq. (5)}$$

Figure 8:
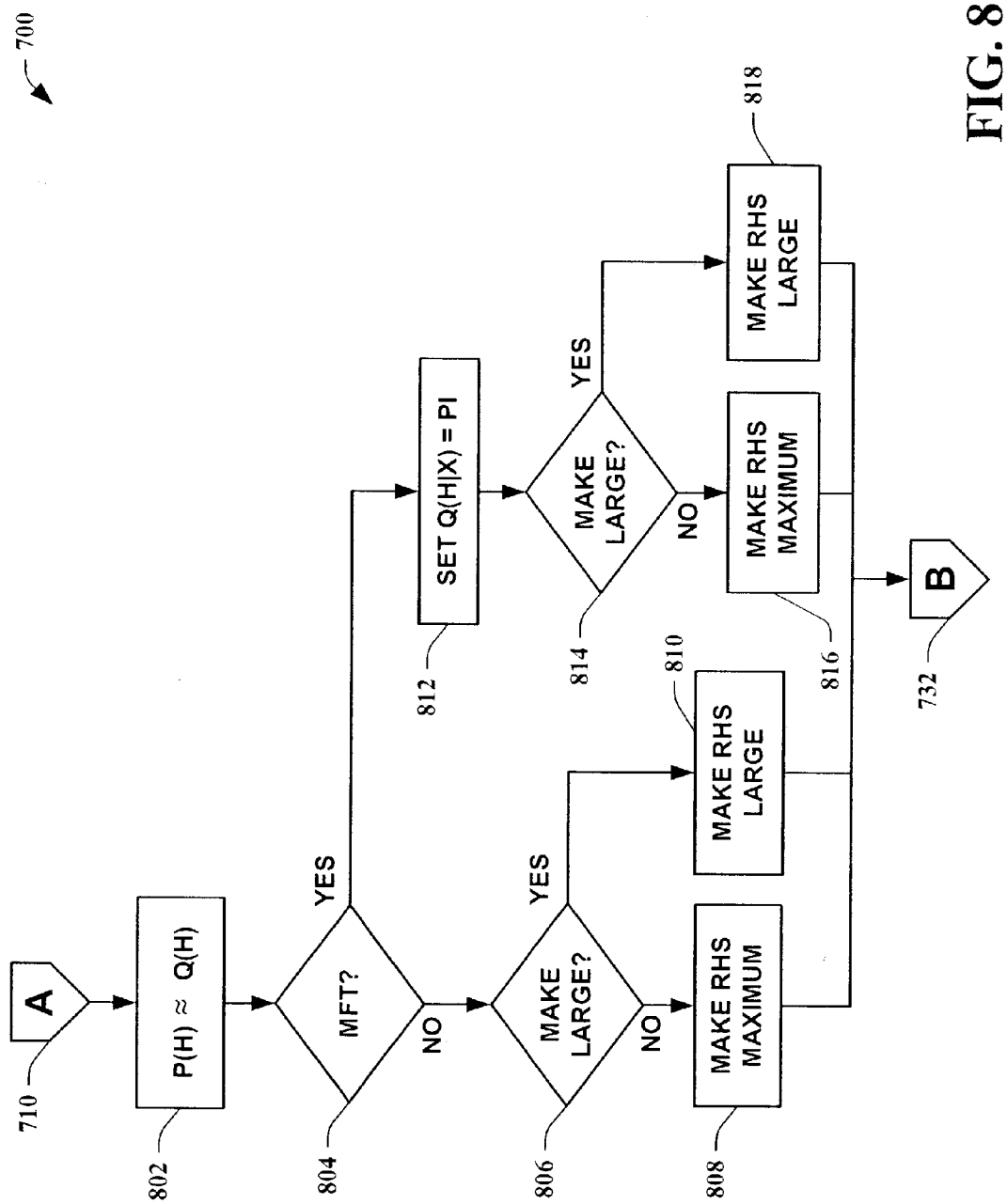
FIG. 8 is still yet another flow diagram of a method of providing tractable variational approximations for inferences in accordance with an aspect of the present invention.

If yes, the method 700 continues to FIG. 8 via connector 710 where it is discussed in detail. If not, a determination is made as to whether a mean-field approximation is to be applied 712. If mean-field is applicable, an arbitrary conditional distribution (ACD) is utilized by employing the following equation:

$$q(h \mid x) = \prod_i q(h_i \mid x); \qquad \text{Eq. (6)}$$

where each $H_i$ corresponds to a single variable in H 714. This leads to what is known as a "mean-field" variational approximation for marginal distribution, p(x). A determination is then made as to whether the bounding equation:

$$\log p(x) \geq \sum_h q(h \mid x) \log \left[ \frac{p(x, h)}{q(h \mid x)} \right]; \qquad \text{Eq. (4)}$$

is to be approximated such that the right hand side (RHS) of Equation (4) is large 716. If yes, the right hand side of the equation is made large 720 and a tractable variational approximation is provided 722, ending the flow 724. If not, the right hand side of the equation is maximized 718 and a tractable variation approximation is provided 722, ending the flow 724. Large is defined as substantially increasing a right hand side of a bounding equation such that it obtains a closer proximity to its maximum value than to its medial value. Maximum is defined as increasing the right hand side of the bounding equation such that it obtains its maximum value.

If, however, mean-field theory is not applied 712, a determination is made as to whether the right hand side of Equation (4) is to be made large 726. If yes, the right hand side of the equation is made large 730 and a tractable variational approximation is provided 722, ending the flow 724. If not, the right hand side of the equation is maximized 728 and a tractable variation approximation is provided 722, ending the flow 724. Large and maximum are as defined supra.

Moving on to FIG. 8, a continuation of the flow diagram of the method 700 of providing tractable variational approximations for inferences in accordance with an aspect of the present invention is depicted. From FIG. 7, a determination is made as to whether an approximation is to be incorporated utilizing an arbitrary conditional distribution (ACD) 708. If yes (following connector 710 from FIG. 7 to FIG. 8), the ACD is utilized 802 such that:

$$p(h|x) \propto q(h|x) \qquad \text{Eq. (5)}$$

A determination is then made as to whether a mean-field approximation is to be applied 804. If mean-field is applicable, an arbitrary conditional distribution (ACD) is utilized by employing the following equation:

$$q(h \mid x) = \prod_i q(h_i \mid x); \qquad \text{Eq. (6)}$$

where each $H_i$ corresponds to a single variable in H 812. This leads to what is known as a "mean-field" variational approximation for p(x). A determination is then made as to whether the bounding equation:

$$\log p(x) \geq \sum_{h} q(h\mid x) \log\left[\frac{p(x, h)}{q(h\mid x)}\right]; \qquad \text{Eq. (4)}$$

is to be approximated such that the right hand side of Equation (4) is large 814. If yes, the right hand side of the equation is made large 818 add (following connector 732 back to FIG. 7) a tractable variational approximation is provided 722, ending the flow 724. If not, the right hand side of the equation is maximized 816 and (following connector 732 back to FIG. 7) a tractable variation approximation is provided 722, ending the flow 724. Large is defined as substantially increasing a right hand side of a bounding equation such that it obtains a closer proximity to its maximum value than to its medial value. Maximum is defined as increasing the right hand side of the bounding equation such that it obtains its maximum value.

It, however, mean-field theory is not applied 804, a determination is made as to whether the right hand side of Equation (4) is to be made large 806. If yes, the right hand side of the equation is made large 810 and (following connector 732 back to FIG. 7) a tractable variational approximation is provided 722, ending the flow 724. If not, the right hand side of the equation is maximized 808 and (following connector 732 back to FIG. 7) a tractable variation approximation is provided 722, ending the flow 724. Large and maximum are as defined supra.

In this manner, the present invention can be employed to provide tractable variational approximations to the degree required for a system. Thus, it is possible to select the degree of accuracy based upon cost factors such as complexity and computational processing time. For example, for faster processing, a "large" bound can prove more beneficial than a "maximum" bound.

Figure 9:
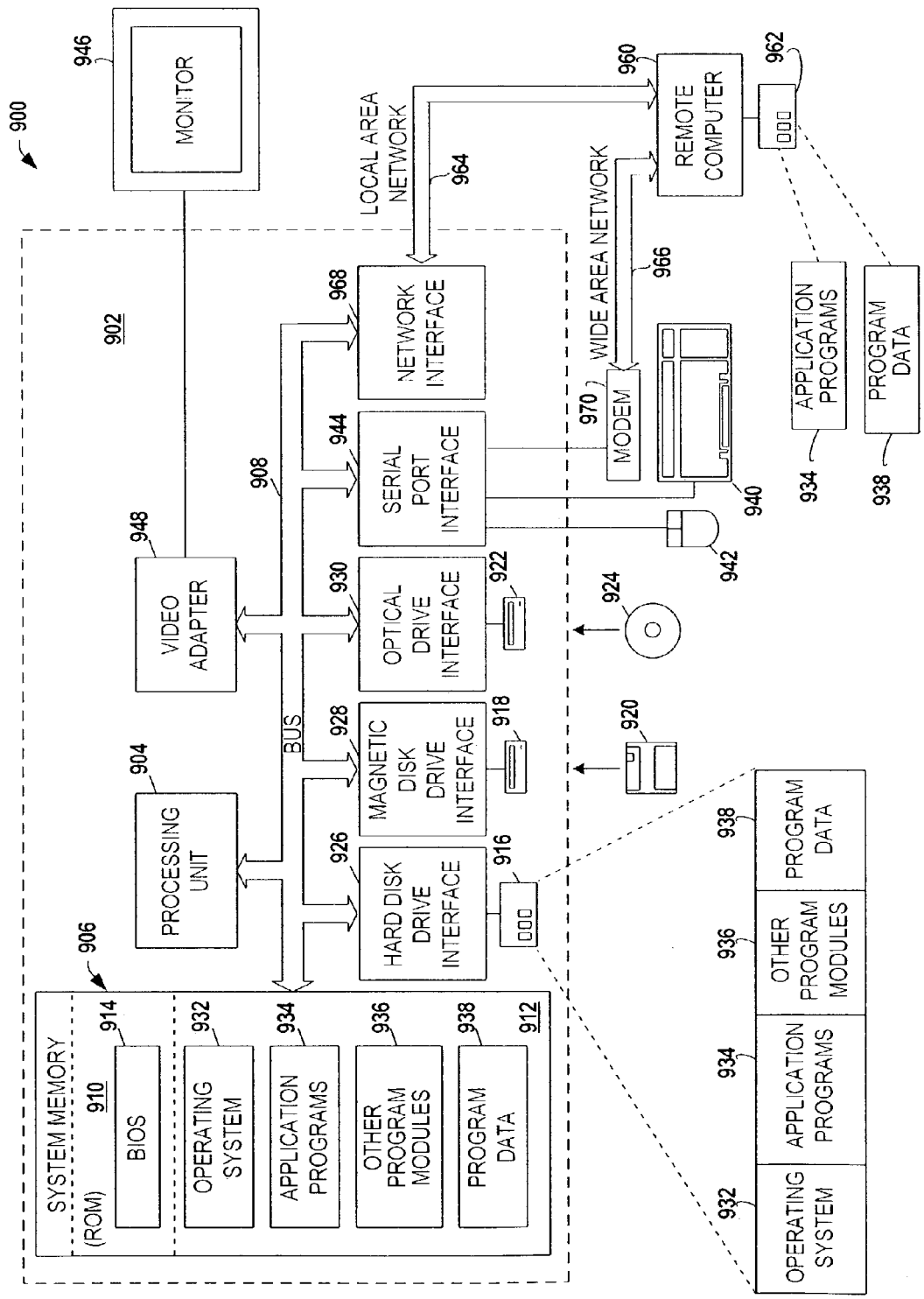
FIG. 9 illustrates an example operating environment in which the present invention can function.

In order to provide additional context for implementing various aspects of the present invention, FIG. 9 and the following discussion is intended to provide a brief, general description of a suitable computing environment 900 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local aid/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 9, an exemplary system environment 900 for implementing the various aspects of the invention includes a conventional computer 902, including a processing unit 904, a system memory 906, and a system bus 908 that couples various system components, including the system memory, to the processing unit 904. The processing unit 904 may be any commercially available or proprietary processor. In addition, the processing unit may be implemented as multi-processor formed of more than one processor, such as may be connected in parallel.

The system bus 908 may be any of several types of bus structure including a memory bus or memory controller, a peripheral bus, and a local bus using any of a variety of conventional bus architectures such as PCI, VESA, Micro-channel, ISA, and EISA, to name a few. The system memory 906 includes read only memory (ROM) 910 and random access memory (RAM) 912. A basic input/output system (BIOS) 914, containing the basic routines that help to transfer information between elements within the computer 902, such as during start-up, is stored in ROM 910.

The computer 902 also may include, for example, a hard disk drive 916, a magnetic disk drive 918, e.g., to read from or write to a removable disk 920, and an optical disk drive 922, e.g., for reading from or writing to a CD-ROM disk 924 or other optical media. The hard disk drive 916, magnetic disk drive 918, and optical disk drive 922 are connected to the system bus 908 by a hard disk drive interface 926, a magnetic disk drive interface 928, and an optical drive interface 930, respectively. The drives 916–922 and their associated computer-readable media provide nonvolatile storage of data, data structures, computer-executable instructions, epic for the computer 902. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 900, and further that any such media may contain computer-executable instructions for performing the methods of the present invention.

A number of program modules may be stored in the drives 916–922 and RAM 912, including an operating system 932, one or more application programs 934, other program modules 936, and program data 938. The operating system 932 may be any suitable operating system or combination of operating systems. By way of example, the application programs 934 and program modules 936 can include an inference component that provides data in accordance with an aspect of the present invention.

A user can enter commands and information into the computer 902 through one or more user input devices, such as a keyboard 940 and a pointing device (e.g., a mouse 942). Other input devices (not shown) may include a microphone, a joystick, a game pad, a satellite dish, wireless remote, a scanner, or the like. These and other input devices are often connected to the processing unit 904 through a serial port interface 944 that is coupled to the system bus 908, but may be connected by other interfaces, such as a parallel port, a game port or a universal serial bus (USB). A monitor 946 or other type of display device is also connected to the system bus 908 via an interface, such as a video adapter 948. In addition to the monitor 946, the computer 902 may include other peripheral output devices (not shown), such as speakers, printers, etc.

It is to be appreciated that the computer 902 can operate in a networked environment using logical connections to one or more remote computers 960. The remote computer 960 may be a workstation, a server computer, a router, a peer device or other common network node, and typically includes many or all of the elements described relative to the computer 902, although, for purposes of brevity, only a memory storage device 962 is illustrated in FIG. 9. The logical connections depicted in FIG. 9 can include a local area network (LAN) 964 and a wide area network (WAN) 966. Such networking environments are commonplace in offices, enterprise-wide computer networks, intranets and the Internet.

When used in a LAN networking environment, for example, the computer 902 is connected to the local network 964 through a network interface or adapter 968. When used in a WAN networking environment, the computer 902 typically includes a modem (e.g., telephone, DSL, cable, etc.) 970, or is connected to a communications server on the LAN, or has other means for establishing communications over the WAN 966, such as the Internet. The modem 970, which can be internal or external relative to the computer 902, is connected to the system bus 908 via the serial port interface 944. In a networked environment, program modules (including application programs 934) and/or program data 938 can be stored in the remote memory storage device 962. It will be appreciated that the network connections shown are exemplary and other means (e.g., wired or wireless) of establishing a communications link between the computers 902 and 960 can be used when carrying out an aspect of the present invention.

In accordance with the practices of persons skilled in the art of computer programming, the present invention has been described with reference to acts and symbolic representations of operations that are performed by a computer, such as the computer 902 or remote computer 960, unless otherwise indicated. Such acts and operations are sometimes referred to as being computer-executed. It will be appreciated that the acts and symbolically represented operations include the manipulation by the processing unit 904 of electrical signals representing data bits which causes a resulting transformation or reduction of the electrical signal representation, and the maintenance of data bits at memory locations in the memory system (including the system memory 906, hard drive 916, floppy disks 920, CD-ROM 924, and remote memory 962) to thereby reconfigure or otherwise alter the computer system's operation, as well as other processing of signals. The memory locations where such data bits are maintained are physical locations that have particular electrical, magnetic, or optical properties corresponding to the data bits.

Figure 10:
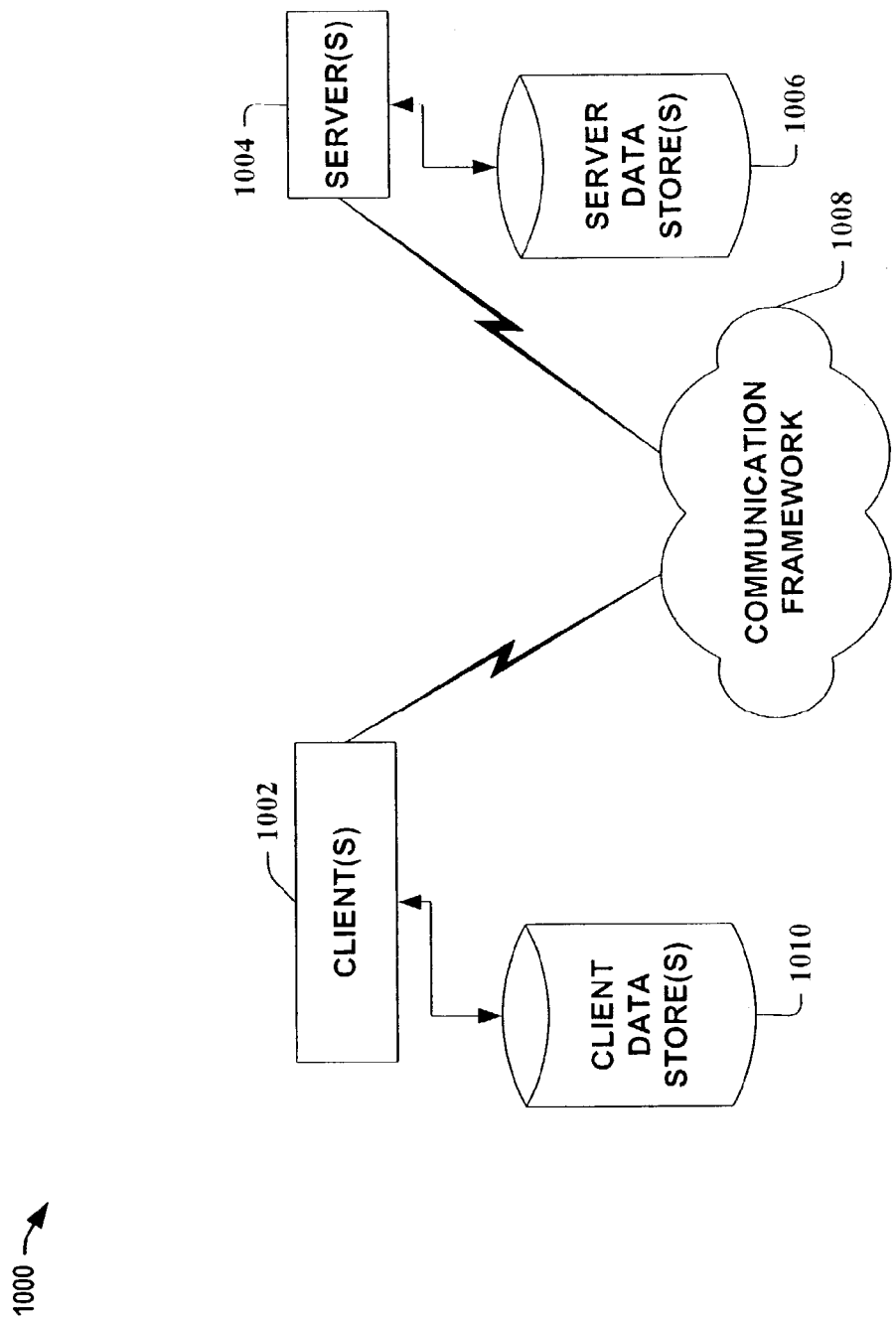
FIG. 10 illustrates another example operating environment in which the present invention can function.

FIG. 10 is another block diagram of a sample computing environment 1000 with which the present invention can interact. The system 1000 further illustrates a system that includes one or more client(s) 1002. The client(s) 1002 can be hardware and/or software (e.g., threads, processes, computing devices). The system 1000 also includes one or more server(s) 1004. The server(s) 1004 can also be hardware and/or software (e.g., threads, processes, computing devices). The servers 1004 can house threads to perform transformations by employing the present invention, for example. One possible communication between a client 1002 and a server 1004 may be in the form of a data packet adapted to be transmitted between two or more computer processes. The system 1000 includes a communication framework 1008 that can be employed to facilitate communications between the client(s) 1002 and the server(s) 1004. The client(s) 1002 are operably connected to one or more client data store(s) 1010 that can be employed to store information local to the client(s) 1002. Similarly, the server(s) 1004 are operably connected to one or more server data store(s) 1006 that can be employed to store information local to the servers 1004.

In one instance of the present invention, a data packet transmitted between two or more computer components that facilitate inferencing of decision-graph Bayesian networks, the data packet is comprised of, at least in part, information relating to a system that determines, based on at least one continuous variable, a tractable variational approximation for inference in the decision-graph Bayesian network In another instance of the present invention, a computer readable medium storing computer executable components of a system for facilitating data analysis is comprised of a component that accesses a decision-graph Bayesian network and an approximation component that provides, based on at least one continuous variable, a tractable variational approximation for inference in the decision-graph Bayesian network.

It is to be appreciated that the systems and/or methods of the present invention can be utilized in a tractable variational inference scheme facilitating computer components and non-computer related components alike. Further, those skilled in the art will recognize that the systems and/or methods of the present invention are employable in a vast array of electronic related technologies, including, but not limited to, computers, servers and/or handheld electronic devices and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A computer-implemented system that facilitates deriving an inference in a Bayesian network comprising:
   a component that accesses a decision-graph Bayesian network; and
   an approximation component that determines a tractable variational approximation by selecting a bound that adjusts processing time through a bounding equation:

$$\log p(x) > \sum_h q(h \mid x) \log \left[ \frac{p(x, h)}{q(h \mid x)} \right];$$

wherein x and h are sets of variables that form a full domain of the Bayesian network, h represents hidden or unobserved nodes in the decision-graph Bayesian network, x represents observed nodes in the decision-graph Bayesian network, p(x) represents a marginal probability for the decision-graph Bayesian network, p(x, h) represents joint probabilities for x and h, and q(h|x) is an arbitrary conditional distribution over h given x.

2. The system of claim 1, the approximation component selects $$q(h \mid x) \text{ such that } \sum_h q(h \mid x) \log\left[\frac{p(x, h)}{q(h \mid x)}\right]$$

of the bounding equation is above a threshold.

3. The system of claim 1, the approximation component selects $$q(h \mid x) \text{ such that } \sum_h q(h \mid x) \log\left[\frac{p(x, h)}{q(h \mid x)}\right]$$

of the bounding equation is maximum.

4. The system of claim 1, the approximation component evaluates the arbitrary conditional distribution over h given x as a product of a set of q($h_i$|x) as given by:

$$q(h \mid x) = \prod_i q(h_i \mid x);$$

where each $h_i$ corresponds to a single variable in h and q(h|x) is greater than zero.

5. The system of claim 4, the approximation component identifies a value of q(h|x) that yields $$\sum_h q(h \mid x) \log\left[\frac{p(x, h)}{q(h \mid x)}\right]$$

of the bounding equation being greater than a threshold.

6. The system of claim 4, the approximation component determines q(h|x) that provides a maximum $$\sum_h q(h \mid x) \log\left[\frac{p(x, h)}{q(h \mid x)}\right]$$

of the bounding equation.

7. The system of claim 1, the approximation component utilizes a conditional probability distribution, p(h|x), and an arbitrary conditional distribution, q(h|x), wherein x and h are sets of variables that form a full domain of the Bayesian network, h represents hidden or unobserved nodes, x represents observed nodes, and p(h|x) and q(h|x) are distributions over h given x, and q(h|x) being utilizes as an approximation for p(h|x) as given by:

p(h|x)∝q(h|x).

8. The system of claim 7, the approximation component chooses q(h|x) such that $$\sum_h q(h \mid x) \log\left[\frac{p(x, h)}{q(h \mid x)}\right]$$

is above a threshold of a bounding equation:

$$\log p(x) \geq \sum_h q(h \mid x) \log\left[\frac{p(x, h)}{q(h \mid x)}\right].$$

9. The system of claim 7, the approximation component selects q(h|x) to obtain a maximum $$\sum_h q(h \mid x) \log\left[\frac{p(x, h)}{q(h \mid x)}\right]$$

of a bounding equation:

$$\log p(x) \geq \sum_h q(h \mid x) \log\left[\frac{p(x, h)}{q(h \mid x)}\right].$$

10. The system of claim 7, the approximation component determines the arbitrary conditional distribution, q(h|x), based at least in part upon a product of a set of q($h_i$|x) as given by:

$$q(h \mid x) = \prod_i q(h_i \mid x)$$

where each $h_i$ corresponds to a single variable in h and q(h|x) is greater than zero.

11. The system of claim 10, the approximation component selects q(h|x) to provide a value greater than a threshold of $$\sum_h q(h \mid x) \log\left[\frac{p(x, h)}{q(h \mid x)}\right]$$

of a bounding equation:

$$\log p(x) \geq \sum_h q(h \mid x) \log\left[\frac{p(x, h)}{q(h \mid x)}\right].$$

12. The system of claim 10, the approximation component determines $$q(h \mid x) \text{ to maximize } \sum_h q(h \mid x) \log\left[\frac{p(x, h)}{q(h \mid x)}\right]$$

of a bounding equation:

$$\log p(x) \geq \sum_{h} q(h\mid x)\log\left[\frac{p(x,h)}{q(h\mid x)}\right].$$

13. A computer readable medium having stored thereon computer executable components of the system of claim 1.

14. A device employing the system of claim 1 comprising at least one selected from the group consisting of a computer, a server, and a handheld electronic device.

15. A computer implemented method for facilitating processing inference in a Bayesian network, comprising:
    providing a decision-graph Bayesian network; and
    utilizing at least one continuous variable to determine a tractable variational approximation by selecting a bound that modifies processing time.

16. The method of claim 15, determining the tractable variational approximation including, at least in part, approximating log p(x) by utilizing a bounding equation:

$$\log p(x) \geq \sum_{h} q(h\mid x)\log\left[\frac{p(x,h)}{q(h\mid x)}\right];$$

wherein x and h are sets of variables that form a full domain of the Bayesian network, h represents hidden or unobserved nodes in the decision-graph Bayesian network, x represents observed nodes in the decision-graph Bayesian network, p(x) represents marginal probability for the decision-graph Bayesian network, p(x, h) represents the joint probabilities for x and h, and q(h|x) is an arbitrary conditional distribution over h given x.

17. The method of claim 16, further including:
    determining a desired result for $$\sum_{h} q(h\mid x)\log\left[\frac{p(x,h)}{q(h\mid x)}\right]$$

of the bounding equation, wherein the desired result comprising at least one selected from the group consisting of making $$\sum_{h} q(h\mid x)\log\left[\frac{p(x,h)}{q(h\mid x)}\right]$$

closer to its maximum than its medial value; and making $$\sum_{h} q(h\mid x)\log\left[\frac{p(x,h)}{q(h\mid x)}\right]$$

maximized.

18. The method of claim 16, the approximation component evaluates the arbitrary conditional distribution over h given x as a product of a set of q(h$_i$|x) as given by:

$$q(h\mid x) = \prod_{i} q(h_i\mid x);$$

where each h$_i$ corresponds to a single variable in h and the value of q(h|x) is greater than zero.

19. The method of claim 18, further including: determining a desired result for $$\sum_{h} q(h\mid x)\log\left[\frac{p(x,h)}{q(h\mid x)}\right]$$

of the bounding equation; wherein the desired result comprising at least one selected from the group consisting of making $$\sum_{h} q(h\mid x)\log\left[\frac{p(x,h)}{q(h\mid x)}\right]$$

closer to its maximum value than to its medial value; and making $$\sum_{h} q(h\mid x)\log\left[\frac{p(x,h)}{q(h\mid x)}\right]$$

maximized.

20. The method of claim 15, determining the tractable variational approximation including, at least in part, utilizing a conditional probability distribution, p(h|x), and an arbitrary conditional distribution, q(h|x), wherein x and h are sets of variables that form a full domain of the Bayesian network, h represents hidden or unobserved nodes, x represents observed nodes, and wherein p(h|x) and q(h|x) are distributions over h given x, and q(h|x) being utilized as an approximation for p(h|x) as given by:

p(h|x)∝q(h|x).

21. The method of claim 20, further including:
    determining a desired parameter for utilization, at least in part, in ascertaining the approximation, wherein the parameter comprising at least one selected from the group consisting of obtaining a value of $$\sum_{h} q(h\mid x)\log\left[\frac{p(x,h)}{q(h\mid x)}\right]$$

with closer proximity to its maximum than to its medial value, and obtaining a maximized $$\sum_{h} q(h\mid x)\log\left[\frac{p(x,h)}{q(h\mid x)}\right]$$

of a bounding equation:

$$\log p(x) \geq \sum_h q(h|x) \log\left[\frac{p(x, h)}{q(h|x)}\right].$$

22. The system of claim 20, the approximation component evaluates conditional distribution over h given x as a product of a set of q( $h_i$|x) as given by:

$$q(h|x) = \prod_i q(h_i|x);$$

where each $h_i$ corresponds to a single variable in h and q(h|x) is greater than zero.

23. The method of claim 22, further including:
determining a desired parameter for utilization, at least in part, in ascertaining the approximation, wherein the parameter comprising at least one selected from the group consisting of obtaining a value of $$\sum_h q(h|x) \log\left[\frac{p(x, h)}{q(h|x)}\right]$$

with closer proximity to its maximum than its medial value, and obtaining a maximized $$\sum_h q(h|x) \log\left[\frac{p(x, h)}{q(h|x)}\right]$$

of a bounding equation:

$$\log p(x) \geq \sum_h q(h|x) \log\left[\frac{p(x, h)}{q(h|x)}\right].$$

24. A device employing the method of claim 15 comprising at least one selected from the group consisting of a computer, a server, and a handheld electronic device.

25. A system for facilitating processing inference in a Bayesian network comprising:
means for approximating, utilizing at least one continuous variable, a tractable variational approximation based on a selectable bound that influences computational processing time.

26. The system of claim 25, the means for approximating including employing, at least in part, approximating log p(x) by utilizing a bounding equation:

$$\log p(x) \geq \sum_h q(h|x) \log\left[\frac{p(x, h)}{q(h|x)}\right];$$

wherein x and h are sets of variables that form a full domain of the Bayesian network, h represents hidden or unobserved nodes in the decision-graph Bayesian network, x represents observed nodes in the decision-graph Bayesian network, p(x) represents marginal probability for the decision-graph Bayesian network, p(x, h) represents the joint probabilities for x and h, and q(h|x) is an arbitrary conditional distribution over h given x.

27. The system of claim 26, the approximation component evaluates the arbitrary conditional distribution over h given x as a product of a set of q( $h_i$|x) as given by:

$$q(h|x) = \prod_i q(h_i|x);$$

where each $h_i$ corresponds to a single variable in h and q(h|x) is a value greater than zero.

28. The method of claim 25, the means for approximating including employing, at least in part, utilizing a conditional probability distribution, p(h|x), and an arbitrary conditional distribution, q(h|x), wherein x and h are sets of variables that form a full domain of the Bayesian network, h represents hidden or unobserved nodes, x represents observed nodes, and wherein p(h|x) and q(h|x) are distributions over h given x, and q(h|x) being utilized as an approximation for p(h|x) as given by:

p(h|x)∝q(h|x).

29. A data packet transmitted between two or more computer components that facilitates inferencing of decision-graph Bayesian networks, the data packet includes information relating to a system that determines, based on at least one continuous variable, a tractable variational approximation with a selectable bound that adjusts computational processing time.

* * * * *